(12) United States Patent
Schwartz

(10) Patent No.: US 6,310,898 B1
(45) Date of Patent: Oct. 30, 2001

(54) COMPRESSED VIDEO AND AUDIO TRANSPORT STREAM MULTIPLEXER

(75) Inventor: Mayer D. Schwartz, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/013,850

(22) Filed: Jan. 27, 1998

(51) Int. Cl.[7] ........................................ H04J 3/02
(52) U.S. Cl. .................. 370/537; 370/389; 370/474; 348/423
(58) Field of Search .................... 370/472, 473, 370/474, 537, 538, 465, 522, 389; 348/423; 375/240.26

(56) References Cited

U.S. PATENT DOCUMENTS

| | | | |
|---|---|---|---|
| 5,521,927 | 5/1996 | Kim et al. | 370/94.2 |
| 5,526,054 | 6/1996 | Greenfield et al. | 348/467 |
| 5,838,678 | * 11/1998 | Davis et al. | 370/389 |
| 5,920,572 | * 7/1999 | Washington et al. | 370/535 |
| 6,058,109 | * 5/2000 | Lechleider | 370/352 |
| 6,088,357 | * 7/2000 | Anderson et al. | 370/392 |

OTHER PUBLICATIONS

Lee, "An Interrgrate Transport Technique for Circuit and Packet Switched Trafic", IEEE No. Conf. 7, pp. 110–118, Mar. 1988.*

* cited by examiner

Primary Examiner—Chau Nguyen
Assistant Examiner—Maikhanh Tran
(74) Attorney, Agent, or Firm—Francis I. Gray

(57) ABSTRACT

A compressed video and audio transport stream multiplexer pre-builds a multiplex pattern in microprocessor local memory using a microprocessor with a DMA controller. The transport stream headers, a null packet, program specific information tables and packetized elementary stream buffers accessed by an assembly buffer that has DMA control blocks, two blocks per transport stream packet. The DMA control blocks are built and loaded into the assembly buffer based upon the number of packets required for the packetized elementary streams and program specific information according to the multiplex pattern. Packetized elementary stream data is received from respective sources and loaded into the packetized elementary stream buffers, and then output according to the DMA control blocks in the assembly buffer to form the transport stream.

4 Claims, 3 Drawing Sheets

COMPRESSED VIDEO AND AUDIO TRANSPORT STREAM MULTIPLEXER

BACKGROUND OF THE INVENTION

The present invention relates to video and audio compression technology, and more particularly to an MPEG-2 transport stream multiplexer for combining program elementary video and audio streams consisting of one or more programs such that no processor-based copying is necessary and all data movement is performed by direct memory access (DMA).

Valid MPEG-2 Transport Streams are fully defined by the International Standard ISO/IEC 13818-1, Generic Coding of Moving Pictures and Associated Audio: Systems (11/94). An MPEG-2 Transport Stream has 188-byte Transport Stream (TS) packets. Each TS packet is identified by a particular 13-bit packet identifier (PID). Every audio and video elementary stream is uniquely identified by the PID used in the TS packets that contain them. Additional PIDs contain Program Specific Information (PSI) that includes a Program Association Table (PAT) and a Program Map Table (PMT) which describe the complete transport stream multiplex pattern. Such a multiplex pattern has one or more programs, each of which has one or more elementary streams. Each TS packet has a header and data. The header contains a sync byte, the packet's PID, a four-bit continuity counter together with other information. The elementary streams are encapsulated as Packetized Elementary Streams (PES) before being broken into the TS packets.

What is desired is a compressed video and audio transport stream multiplexer for combining elementary streams and program specific information without burdening a microprocessor with excessive copying.

BRIEF SUMMARY OF THE INVENTION

Accordingly the present invention provides a compressed video and audio transport stream multiplexer that reduces the burden on a microprocessor by pre-building a multiplex pattern in microprocessor local memory. The microprocessor has a DMA controller, and an assembly buffer is allocated in the local memory for DMA control blocks. Transport stream headers are generated as well as special headers for clock and stuffing. A null packet is provided and program specific tables are generated for the multiplex pattern. Packetized elementary streams from various sources are loaded into packetized elementary stream buffers. The DMA control blocks are filled in the assembly buffer and the data is transferred from the local memory according to the multiplex pattern to provide output transport stream packets.

The objects, advantages and other novel features of the present invention are apparent from the following detailed description when read in conjunction with the appended claims and attached drawing.

DETAILED DESCRIPTION OF THE INVENTION

Figure 1:
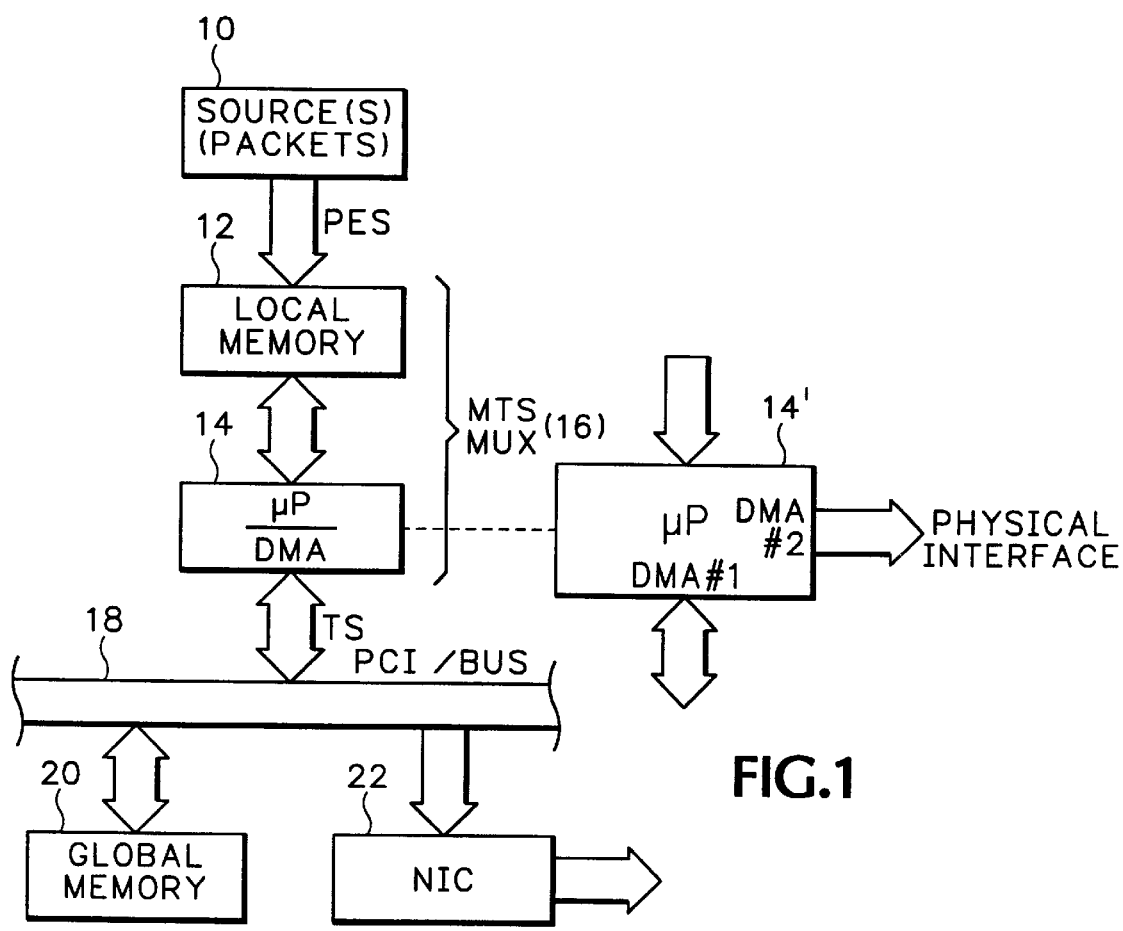
FIG. 1 is a block diagram view of a system for generating an MPEG-2 transport stream from packetized elementary data streams using a compressed video and audio transport stream multiplexer according to the present invention.

Referring now to FIG. 1 one or more sources 10 provide packetized elementary streams (PES) for one or more programs. Each program may have either or both video and audio PES streams. The PES streams are stored in specified areas of microprocessor local memory 12 that is accessed by a microprocessor 14 which includes a direct memory access (DMA) controller. The storage of the PES streams in the local memory 12 may be asynchronous with respect to each other and the multiplexing process. The combination of the local memory 12 and microprocessor/DMA controller 14 serves as a compressed video and audio transport stream multiplexer 16. The microprocessor/DMA controller 14 interleaves the PES streams with appropriate tables that define the multiplex pattern into the transport stream which is then written to a global bus 18, such as a peripheral component interconnect (PCI) bus, into a global memory 20, or is transferred over any other physical interface that may be coupled to a DMA controller. From the global memory 20 the transport stream may be transmitted as part of an ATM message stream via an appropriate network interface controller (NIC) 22 coupled to the PCI bus 18.

The following multiplexing functions are performed by the transport stream multiplexer 16 while generating a valid MPEG-2 Transport Stream: (1) insert TS packets containing PSI; (2) break up PES packets into individual TS packets with appropriate TS packet headers; (3) ensure that continuity counters are properly maintained; (4) insert NULL packets as appropriate; and (6) insert Program Clock References (PCR). The microprocessor/DMA 14 controller handles these functions and transfers data from the local memory 12, accessible to the microprocessor, as the transport stream to an output channel or physical interface, which could be the global PCI memory 20 for example.

Figure 2:
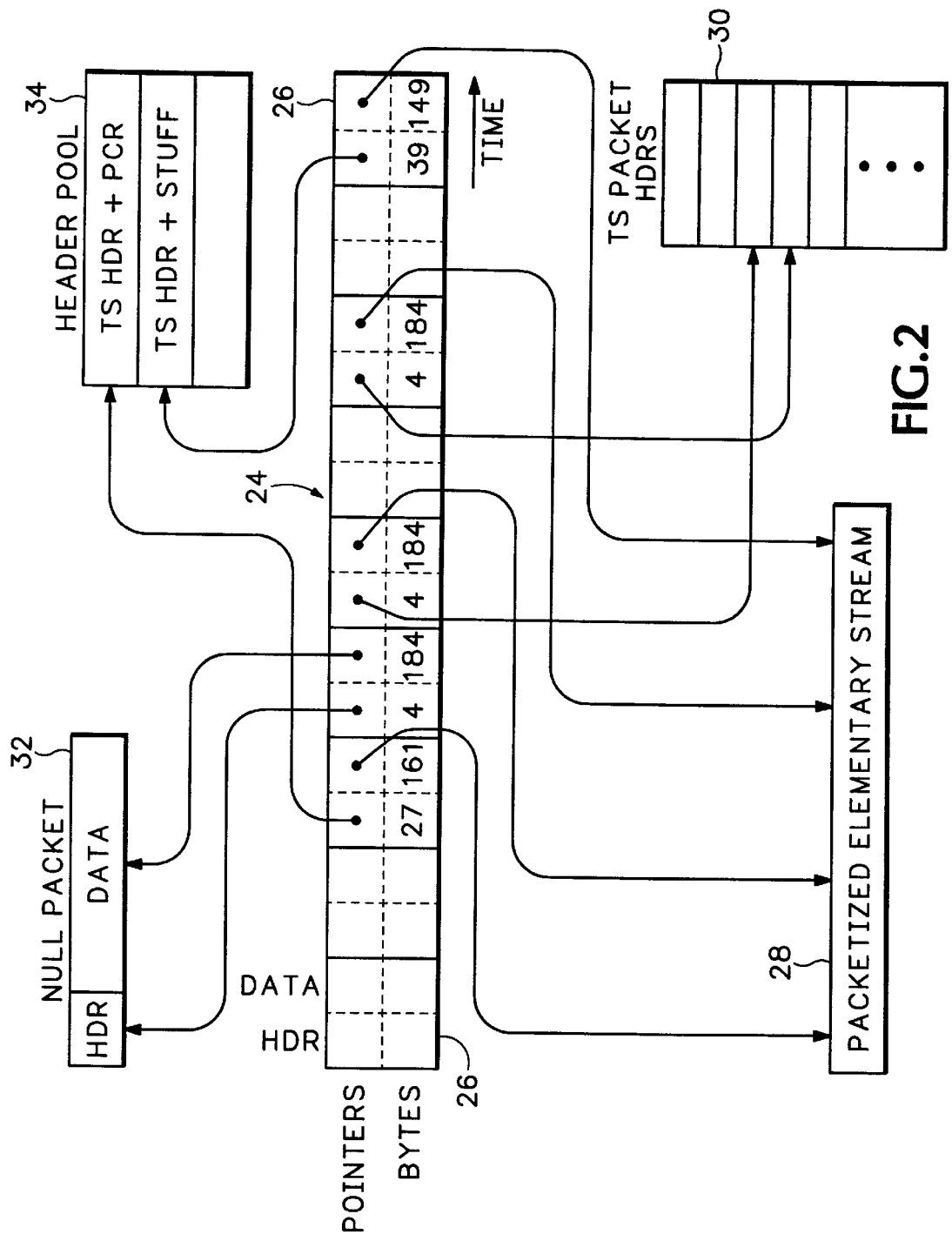
FIG. 2 is a diagramatic view of the local memory illustrating the assembly buffer according to the present invention.

The multiplexing function performed by the transport stream multiplexer 16 does not require the microprocessor portion of the microprocessor/DMA controller 14 to do any data or header copying whatsoever. As shown in FIG. 2 a circular assembly buffer 24 has a plurality (n) of elements 26, with each element containing a pair of DMA control blocks so that the DMA control blocks are chained together. Each DMA control block has at least a local address pointer into the local memory 12 (source), a global address pointer into the global memory 20 (destination) and a length field—all values being byte oriented. Every TS packet is represented by the pair of DMA control blocks, or one element 26 of the circular assembly buffer 24, one block for the TS header and the other for any data. The total of the two field lengths equals 188 bytes. The continuity counter in the TS packet header is modulo 16, therefore a 16 element array of 4-byte TS packet headers 30 is constructed for each elementary stream, Program Map Table (PMT) and Program Association Table (PAT) to be inserted into the transport stream. The PMT and PAT tables define the PSI information that indicates the multiplex pattern of the transport stream. There also is a TS packet headers pool 34 which includes TS packet headers with Program Clock References (PCRs) and with stuffing bytes. At a given overall transport stream bit rate the circular assembly buffer 24 of DMA control blocks represents x seconds of TS packets. Enough header memory is allocated to hold at least x seconds of headers in the worst case. For simplicity of explanation the buffer 24 shown represents a single elementary stream, and no PSI tables are shown.

The bottom row of the circular assembly buffer 24 represents the lengths, and each element 26 has two values—a header value and a data value. For example one element has 27/161, the sum of which is 188 bytes. Others have 4/184 and 39/149. For each length there is a pointer associated with it that points to other tables or memory areas in the local memory 12. These tables are pre-built. The PES streams from the sources 10 are input to a PES buffer 28 which contains multiple frames (video or audio) of data. A null packet 32 is provided, and the pool 34 of memory for TS headers is established. The header DMA control block for TS packet 27/161 has a pointer that references from the header pool 34 a first TS packet header that includes the TS header plus the PCR. The data DMA control block points to the start of data from the PES buffer 28, where it extracts 161 bytes of data from the PES stream. Thus the header and accompanying PES data are read out from the local memory 12 and transferred to the global memory 20 as a TS packet with the proper syntax as part of the transport stream. For a null packet the header and data DMA control blocks point to the header and data respectively of the null packet 32. For continuing PES TS packets the PIDs are accessed from the header table 30 and data in sequence from the PES buffer 28 are accessed. For the final portion of the PES stream that completes the frame, but does not fill a TS packet, the TS stuff header is accessed from the header pool 34 and stuff bytes are included in the TS packet together with the remaining PES bytes to complete the frame.

The circular assembly buffer 24 may be built up as data is being multiplexed into the MTS transport stream. New packet DMA control blocks are inserted into the assembly buffer 24 as old ones are removed. There are four pointers that represent the assembly buffer 24: sp—a pointer to the first element 26 in the buffer; ep—a pointer to the last+1 element in the assembly buffer; outp—a pointer to the next element to be removed from the buffer; and inp—a pointer to the next available element in the buffer. For example in one implementation the buffer 24 has elements of size 64 and the number of elements is chosen for a buffer size of 1.504 seconds at a maximum transport stream bit rate of 65.536 Mbs or a buffer size of 65,536 TS packets. This results in the allocation of 4 Mbytes of local memory 12 for the assembly buffer 24.

In order to calculate a pattern of placement of TS packets having audio, video and PSI information, the following assumptions are made:

(1) constant bit rate video and audio streams, with stuffing making up any shortfall;

(2) for video the source puts out PES packets, each packet being a separate picture or frame of the video;

(3) unused TS packets, slotted for video, are filled with null packets;

(4) each audio frame is in a separate PES packet, with the elementary stream buffer 28 being sized based upon the audio;

(5) PCRs are preplaced in the video TS packets; and (6) the number of TS packets in the PSI stream is divisible by 16 so that sequence numbers may be pre-determined.

Figure 3:
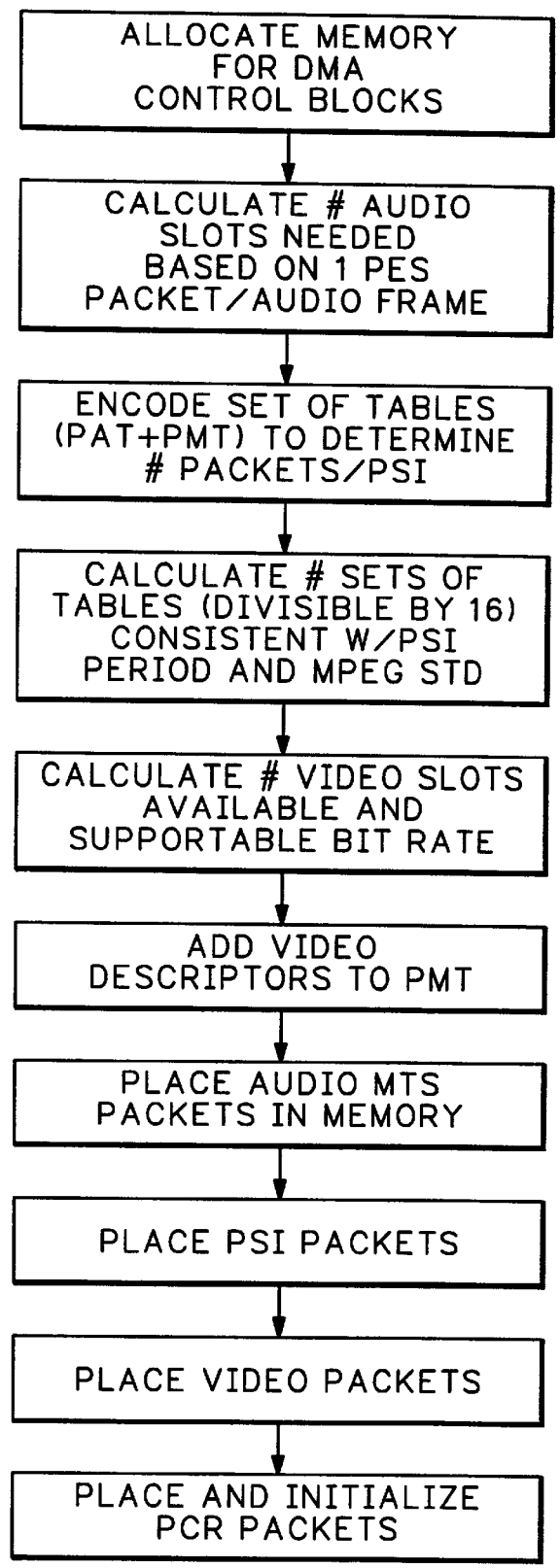
FIG. 3 is a flow chart view of the process for pre-building a multiplexer pattern according to the present invention.

The microprocessor/DMA controller 14, as shown in FIG. 3, allocates the circular assembly buffer 24 for the DMA blocks. Then the number of audio slots needed for an audio PES frame is calculated. A set of PAT and PMT tables are encoded to determine the number of packets required for the PSI, and then the number of sets of tables, divisible by 16 and consistent with the PSI period and MPEG standard, are calculated. Finally the number of video slots available and a supportable bit rate are determined, with video descriptors being added to the PMT. From the multiplex pattern determined by the PSI the audio TS packet pointers are placed in the assembly buffer 24, the PSI TS packet pointers are placed in the assembly buffer, the video TS packet pointers are placed in the assembly buffer and the PCR TS packet pointers are placed in the assembly buffer and initialized. The supportable video bit rate is provided to the source compression encoder to control the encoding of the video data.

Thus the present invention provides a compressed video and audio transport stream multiplexer that pre-calculates DMA pointers in the form of DMA block controls for headers and tables that define the multiplex pattern, and then builds the transport stream from the pre-built headers and tables and data packetized elementary streams in accordance with the defined multiplex pattern.

What is claimed is:

1. A compressed video and audio transport stream multiplexer comprising:

a local memory;

means for pre-building a multiplex pattern in the local memory; and means for generating an output transport stream in the form of transport stream packets from data packetized elementary streams according to the multiplex pattern.

2. The multiplexer according to claim 1 wherein the pre-building means comprises:

means for allocating an assembly buffer in the local memory for DMA control blocks, each pair of DMA control blocks representing a transport stream packet;

means for generating header and program specific information tables that define the multiplex pattern;

means for determining the number of transport stream packets required for the data packetized elementary streams according to the multiplex pattern; and means for placing the DMA blocks in the assembly buffer according to the multiplex pattern.

3. A method of compressed video transport stream multiplexing comprising the steps of:

pre-building a multiplex pattern in a local memory; and generating an output transport stream in the form of transport stream packets from data packetized elementary streams according to the multiplex pattern.

4. The multiplexing method according to claim 3 wherein the pre-building step comprises the steps of:

allocating an assembly buffer in the local memory for DMA control blocks, each pair of DMA control blocks representing a transport stream packet;

generating header and program specific information tables that define the multiplex pattern;

determining the number of transport stream packets required for the data packetized elementary streams according to the multiplex pattern; and placing the DMA blocks in the assembly buffer according to the multiplex pattern.

\* \* \* \* \*